United States Patent
Rathnam et al.

(10) Patent No.: US 12,363,530 B1
(45) Date of Patent: Jul. 15, 2025

(54) PORTABLE COMMUNICATION DEVICE PROFILE MANAGEMENT USING TOKEN

(71) Applicant: Relay, Inc., Raleigh, NC (US)

(72) Inventors: Sai Rathnam, Raleigh, NC (US); Adam Cook, Apex, NC (US); Jared Kashimba, Micanopy, FL (US)

(73) Assignee: Relay, Inc., Raleigh, NC (US)

( * ) Notice: Subject to any disclaimer, the term of this patent is extended or adjusted under 35 U.S.C. 154(b) by 0 days.

(21) Appl. No.: 19/088,334

(22) Filed: Mar. 24, 2025

(51) Int. Cl.
  *H04W 12/06*   (2021.01)
  *H04W 4/80*   (2018.01)
  *H04W 8/22*   (2009.01)
  *H04W 4/02*   (2018.01)
  *H04W 4/021*   (2018.01)
  *H04W 4/029*   (2018.01)

(52) U.S. Cl.
  CPC ............. *H04W 12/06* (2013.01); *H04W 4/80* (2018.02); *H04W 8/22* (2013.01); *H04W 4/02* (2013.01); *H04W 4/021* (2013.01); *H04W 4/029* (2018.02)

(58) Field of Classification Search
  None
  See application file for complete search history.

(56) References Cited

U.S. PATENT DOCUMENTS

| | | | | |
|---|---|---|---|---|
| 11,622,359 B2* | 4/2023 | Rose | ...................... | H04W 72/56 370/329 |
| 11,805,527 B2* | 10/2023 | Folke | .................. | H04W 72/569 |
| 12,082,069 B1* | 9/2024 | Hartman | ................ | H04W 4/021 |
| 12,182,530 B1* | 12/2024 | Cook | ..................... | H04L 67/306 |
| 2013/0091452 A1* | 4/2013 | Sorden | ..................... | G06F 30/20 715/771 |
| 2014/0248996 A1* | 9/2014 | Adel | ....................... | H04W 4/80 482/8 |
| 2016/0026776 A1* | 1/2016 | Hurst | .................... | H04L 9/0833 713/165 |
| 2016/0135167 A1* | 5/2016 | Dong | ..................... | H04M 19/04 370/329 |
| 2017/0293848 A1* | 10/2017 | Sorden | ............... | G01C 21/3697 |
| 2017/0295559 A1* | 10/2017 | Agiwal | .................. | H04W 72/23 |
| 2019/0053043 A1* | 2/2019 | Cha | ........................ | G06F 1/1656 |
| 2019/0124684 A1* | 4/2019 | Folke | .................. | H04W 72/569 |
| 2019/0335294 A1* | 10/2019 | Sorden | ............... | G01C 21/3664 |
| 2021/0153065 A1* | 5/2021 | Adjakple | .......... | H04W 28/0268 |

(Continued)

FOREIGN PATENT DOCUMENTS

| KR | 20140064601 A | * | 5/2014 | ............ H04W 12/06 |
|---|---|---|---|---|
| WO | WO-2019107977 A1 | * | 6/2019 | ............ G06F 21/606 |

*Primary Examiner* — Ali H. Cheema

(74) *Attorney, Agent, or Firm* — Gregory Stephens

(57) ABSTRACT

In an example, a portable communication device (PCD) is dynamically configured, providing a profile to the PCD. A portable communication device may be dynamically configured using a profile based on an event. The profile includes data that allows users of PCDs to be provided with one or more logical communication channels for communicating. In an example, an artificial intelligent (AI) assistant is provided for use in connection with a PCD. An example implementation maintains a user profile including one or more profile tags indicative of attributes applicable to respective users. User input is received at an AI assistant executing in association with a PCD and the user input is processed to identify matching profile tag values, permitting one or more tasks to be performed involving related PCDs.

20 Claims, 11 Drawing Sheets

(56) References Cited

U.S. PATENT DOCUMENTS

| | | | |
|---|---|---|---|
| 2021/0240729 A1* | 8/2021 | Grant | H04L 67/306 |
| 2022/0070650 A1* | 3/2022 | Yoon | H04W 8/02 |
| 2022/0078602 A1* | 3/2022 | Tait | G06F 8/65 |
| 2022/0377081 A1* | 11/2022 | Lim | H04L 67/303 |
| 2023/0072151 A1* | 3/2023 | Sorden | G01C 21/3697 |
| 2024/0251231 A1* | 7/2024 | Mishra | H04W 8/183 |
| 2025/0113176 A1* | 4/2025 | Chen | H04W 8/20 |

* cited by examiner

PORTABLE COMMUNICATION DEVICE PROFILE MANAGEMENT USING TOKEN

BACKGROUND

1. Field

The disclosed subject matter generally pertains to managing portable communication devices (PCDs). Certain subject matter relates to managing and using profile data in association with an artificial intelligence (AI) assistant.

2. Description of the Related Art

In many voice and data communication contexts, such as in an enterprise setting, it is not desirable to have users operate a smartphone, whether a personal smartphone or a company-supplied smartphone. Among considerations impacting a decision not to use a smartphone are potential distractions which may impact workplace safety and the requirement to manage access to secure data.

The Relay® device by Relay, Inc. is a handheld portable communication device (PCD) that provides voice communication with other Relay® devices, similar to a walkie-talkie. One embodiment of a Relay® device uses a voice interface while other embodiments may include a limited small screen primarily used to convey device diagnostic information such as, for instance, battery status, signal strength, channel information, time, etc. The Relay® device can use a wireless Internet Protocol (IP) communication link rather than a circuit switched communication link to exchange voice messages and data with a communication platform server (CPS). The CPS manages voice messages and data among various endpoints. The communication device(s) may wirelessly connect to an IP network over one or more wireless IP interfaces and communication links. The IP communication link may use one or more of the Wi-Fi channels and protocols, such as the 802.11 family, or may use one of the many cellular IP air interfaces and over-the-air (OTA) RF protocols.

SUMMARY

Operating a device having a simplified interface is difficult, such as a voice interface with a limited push button interface. For example, it can be difficult to engage with a virtual assistant program of the device without memorizing available commands.

In an embodiment, a portable communication device (PCD) is dynamically configured using stored profiles based on device events. An example implementation establishes a profile based on respective category values in one or more sets of categories stored on the PCD. When an event associated with a PCD is received, one or more category values are obtained from the PCD. A communication platform server (CPS) matches the one or more category values to a stored profile which is provided to the PCD.

In an embodiment, a PCD is dynamically configured using a profile based on a token-related event. An example implementation associates a profile for a PCD and a physical token of a user. After the physical token is proximate to the PCD, use of a profile associated with the physical token is authenticated. The profile associated with the physical token and the user are provided to the PCD, which is configured based on the profile to use one or more logical communication channels.

In an embodiment, an artificial intelligent (AI) assistant is provided for use in connection with a PCD. An example implementation maintains, for each user actively associated with a PCD, a user profile including one or more profile tags indicative of attributes applicable to respective users. User input is received at an AI assistant executing in association with a first PCD and the user input is processed to identify one or more first profile tag values contained in the user input. An intent is derived from the user input and one or more second PCDs are identified, with a respective user profile having one or more respective profile tag values matching the one or more first profile tag values. One or more tasks are performed, involving the one or more second PCDs, based on the intent.

An embodiment includes one or more of methods, systems, and products. An embodiment includes a system comprising a set of one or more processors and a non-transitory computer readable medium having code executable by the set of one or more processors. The code is configurable to perform one or more of the methods, or parts thereof, according to an embodiment. An embodiment provides a computer program product comprising a non-transitory computer readable medium having code executable by a set of one or more processors. The code is configurable to perform one or more of the methods, or parts thereof, according to an embodiment.

The foregoing is a summary and thus may contain simplifications, generalizations, and omissions of detail; consequently, those skilled in the art will appreciate that the summary is illustrative only and is not intended to be in any way limiting.

These and other features and characteristics of the example embodiments, as well as the methods of operation and functions of the related elements of structure and the combination thereof, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of a claimed invention.

DETAILED DESCRIPTION OF EXAMPLE EMBODIMENTS

Figure 1:
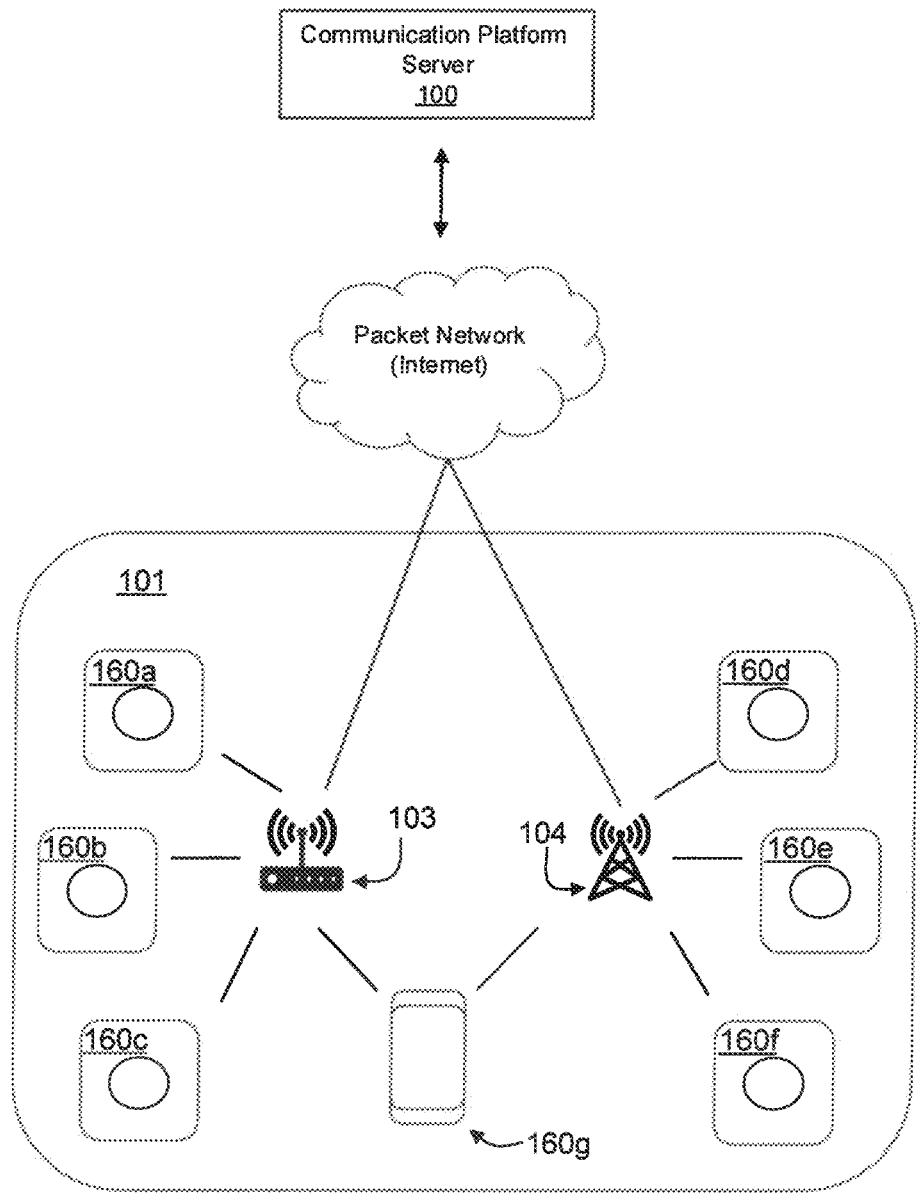
FIG. 1 illustrates a diagram of example system components according to an embodiment.

The described features, structures, or characteristics of the example embodiments may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well known structures, materials, or operations are not shown or described in detail to avoid obfuscation.

One example of a portable communication device (PCD) may refer to a device with a much-reduced input interface, such as a voice interface with a limited set of push buttons, without a camera, screen or touchscreen display, where the PCD is able to operate using a plurality of standard radio channels (hereinafter "voice interface PCD"). An example of a voice interface PCD is the Relay® device offered by Relay, Inc. Such devices find use in, for example, facilitating voice communication among users keeping a respective PCD on their person. In a non-limiting example, a PCD provides a push-to-talk functionality, like conventional walkie-talkies for radio communications.

It should be noted that there may be other configurations of PCDs that include a small screen primarily used to convey device diagnostic information such as, for instance, battery status, signal strength, channel information, time, etc. The screen is not designed to accept input (i.e., it is not a touchscreen). Such a configuration may also be characterized as having a much-reduced input interface like that described above for the voice interface PCD. The following description and claims apply equally to various embodiments of a PCD.

PCDs require sophisticated communication capabilities, including customized, secure, and/or personal logical communication channels, for example a voice channel only connecting members of a given team. Configuring a PCD, for example to provide the appropriate logical communication channel for the user, at the appropriate times, and in the appropriate operational contexts, is challenging. In some cases, configuring a PCD is made more complicated by having only a simplified interface, such as with a voice interface or limited screen PCD.

A logical communication channel may be characterized as a unique private voice or data communication channel upon which only members of that channel may communicate. Logical channels are managed by a communication platform server (CPS) to control which PCDs may be added or deleted as members. Logical voice channels define channels upon which voice messages may be exchanged. Logical data channels primarily exchange data for example where data may be voice or text based. In some instances, an AI assistant may be included as a member of a voice channel and the other members of the logical channel may interact with the AI assistant. Logical communication channels may also be one-way, for instance, to allow the CPS to broadcast to PCDs generally without the ability of a PCD to communicate back on such a channel (e.g., for more broad-based announcements or emergency type announcements). There are no limits placed on the number or configuration of logical channels that the CPS may manage for a given set of PCDs.

An embodiment provides dynamic configuration of a PCD based on device-related events. In an embodiment, a profile type is established having a set of categories and respective category values for a PCD configuration. Responsive to an event associated with a PCD, one or more category values are obtained from the PCD and matched to the respective category values of stored profile types. This permits an embodiment to provide a matched profile of the stored profile types to the PCD. Using the matched profile, the PCD is configured per the category values of the profile.

Profiles may be created by and stored on the CPS and loaded, via various mechanisms, on a device. A profile is typically associated with a specific user, a specific role, or a specific location, or some combination thereof and may be referred to as a user profile or device profile.

The provision of profiles and maintaining the same as active within the system provides metadata useful in contextual processing of user input requests, for example using an artificial intelligence (AI) assistant. In an embodiment, the AI assistant uses the profile metadata or tags to interpret user input, determine intent, provide contextualized responsive actions, or a combination of the foregoing.

The description now turns to the figures. The illustrated example embodiments will be best understood by reference to the figures. The following description is intended only by way of example, and simply illustrates certain example embodiments.

Illustrated in FIG. 1 is a system implemented in a network environment including CPS 100 enabling a plurality of PCDs 160a-g to communicate with one another through message exchanges. The messages may be exchanged using wireless communication, with common examples including wireless push-to-talk (PTT) communication over a voice-based logical communication channel logically coupling or grouping a subset of available PCDs. The logical communication channel is an abstraction of the physical communication channels used, such as a Wi-Fi, cellular, or Long Range (LoRa) physical communication channel. For PCDs 160a-g, messages may be managed by software running on a server such as CPS 100, for example providing a message queue, routing messages, or configuring a PCD. In addition, certain PCDs, such as PCD 160g, may be provided in a different form factor, such as a smartphone running a mobile app to provide access and functions to connect to other PCDs 160a-f, for example using PTT over cellular or Wi-Fi. In an embodiment PCDs 160a-f may be voice interface PCDs as described herein. In another embodiment, PCDs may be limited screen PCDs.

In some example embodiments, PCDs 160a-g are configured to operate within a geofenced area 101. In an example functionality, communication outside area 101 may be limited. Connectivity may be through private network devices in range of area 101, for example Wi-Fi access point 103 and cellular access device 104 with coverage that includes all or a portion of area 101, providing access to CPS 100 via a broader packet network such as the Internet via typical wireless carrier infrastructure. Note that the network provided may be private or public, or some combination thereof, using conventional networking solutions.

Figure 2:
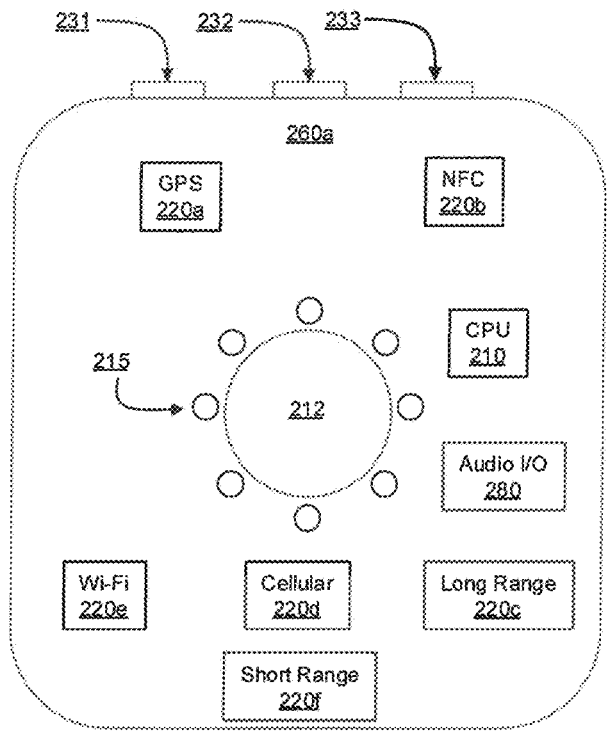
FIG. 2 illustrates an example portable communication device and components according to an embodiment.
Figure 2B:
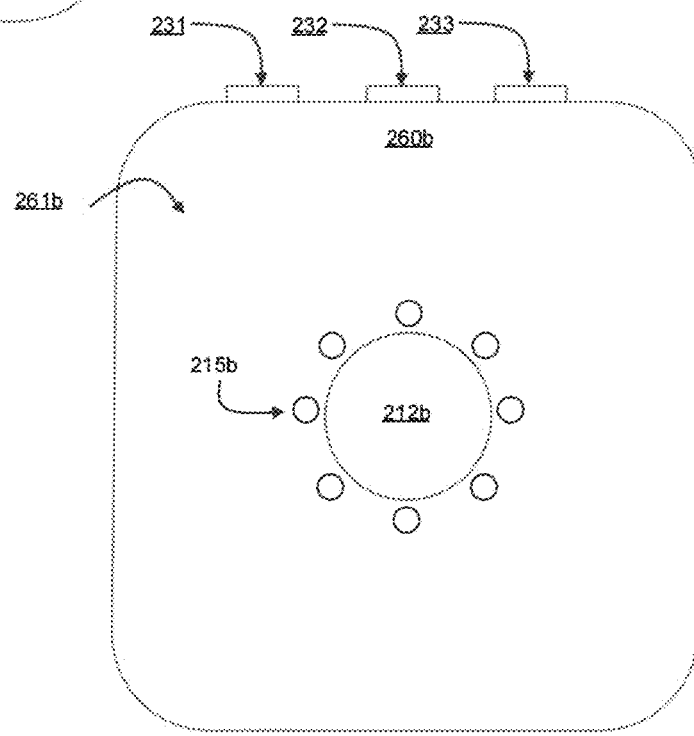
FIG. 2B illustrates an example portable communication device exterior according to an embodiment.

Referring to FIGS. 2 and 2B, in an embodiment a PCD 260a, 260b may be a voice interface PCD featuring a voice interface and limited control buttons 212, 212b such as the Relay® device. In an embodiment, PCD 260a may include one or more of several radio interfaces, including a GPS module 220a, a near field communication (NFC) device 220b, a LoRa transceiver 220c, a cellular transceiver 220d, a Wi-Fi transceiver 220e, and a short-range wireless (e.g., BLUETOOTH) transceiver 220f. Cellular transceiver 220d may comprise a radio frequency (RF) chipset configured to communicate using a plurality of wireless cellular frequency bands and protocols. Wi-Fi transceiver 220e may comprise an RF chipset configured to communicate using one or more of the 802.11 protocols commonly referred to as Wi-Fi. Short range transceiver 220f may comprise an RF chipset configured to communicate using the BLUETOOTH or other short range wireless protocol(s). Long-range transceiver 220c may comprise an RF chipset configured to communicate using yet another RF communication protocol known as LoRa. LoRa is a physical radio communication protocol ideal for long range wireless applications and long battery life. Each of PCD 260a components 220a-f, 280 may be controlled by one or more CPU 210, such as in the form of a microprocessor that communicates with the internal components using a bus (not illustrated).

The view of FIG. 2B illustrates a user's view of PCD 260b. PCD 260b includes control button 212b, which may be touched or pressed to activate a function, such as a voice interface. Indicator lights 215b, which may take the form of light emitting diodes (LEDs), may be used as an output device, for example to indicate the device state, such as powering or powered on, powering or powered off, battery level, connected/disconnected, PTT input receiver activated, message transmitted, message received, direction, etc. In the view of FIG. 2B, a surface 261b covers internal components illustrated in FIG. 2A, such as the audio I/O device 280. Surface 261b may provide openings for receiving and transmitting audio signals, for example audio input via a microphone included in audio I/O device 280 and transmitting audio output via a speaker included in audio I/O device 280.

With respect to a user interface, a control button 212, 212b and a plurality of indicator lights 215, 215b are shown. In an embodiment, the PCD 260a may include one or more physical buttons and/or rocker switches. For example, as shown in FIGS. 2 and 2B, three physical buttons 231, 232, and 233 may be present on the side of the PCD. It should be understood that FIGS. 2 and 2B are for illustrative purposes only and that other interface designs and/or setups may be utilized (e.g., those shown in FIGS. 3, 3B, 4, 4B, and 4C).

Figure 3:
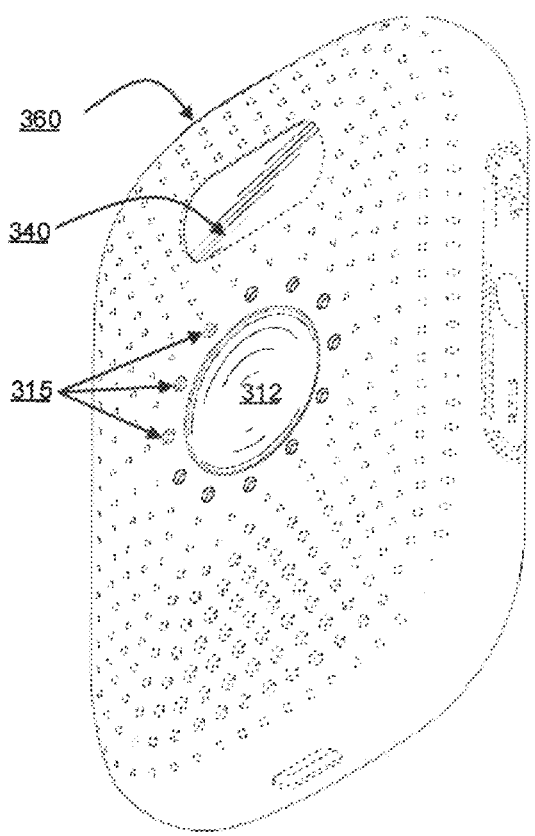
FIG. 3 illustrates a perspective view of another example portable communication device exterior according to an embodiment.
Figure 3B:
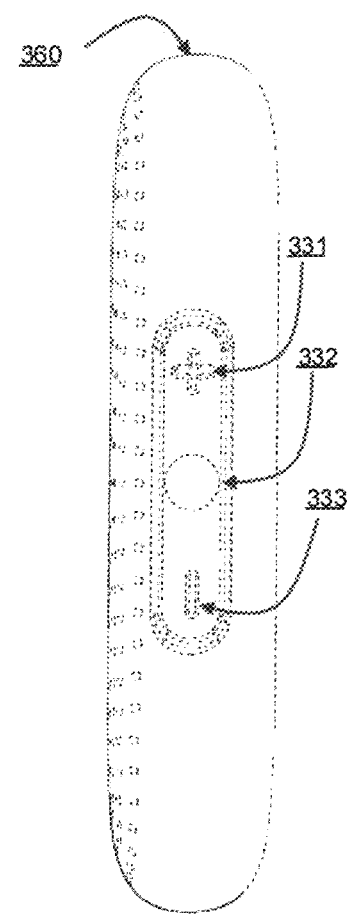
FIG. 3B illustrates a side view of the example portable communication device of FIG. 3.

Referring to FIGS. 3 and 3B, in an embodiment a PCD 360 may include a screen 340, and feature a voice interface and control button 312. In an embodiment, PCD 360 may include one or more of several radio interfaces (not shown), including a GPS module, a near field communication (NFC) device, a LoRa transceiver, a cellular transceiver, a Wi-Fi transceiver, and a short-range wireless (e.g., BLUETOOTH) transceiver. Components of PCD 360 may be controlled by one or more CPUs (not shown), such as in the form of a microprocessor that communicates with the internal components using a bus (not shown).

Control button 312 may be touched or pressed to activate a function, such as a voice interface. Indicator lights 315, which may take the form of light emitting diodes (LEDs), may be used as an output device, for example to indicate the device state, such as powering or powered on, powering or powered off, battery level, connected/disconnected, PTT input receiver activated, message transmitted, message received, direction, etc. The surface of PCD 360 may provide openings for receiving and transmitting audio signals, for example audio input via a microphone included in audio I/O device (not shown) and transmitting audio output via a speaker (not shown). In a further embodiment, the PCD 360 may include one or more physical buttons and/or rocker switches. For example, as shown in FIG. 3B, three physical buttons 331, 332, and 333 may be present on the side of the PCD to allow for user input/control, for example volume up, volume down, and mute.

Figure 4:
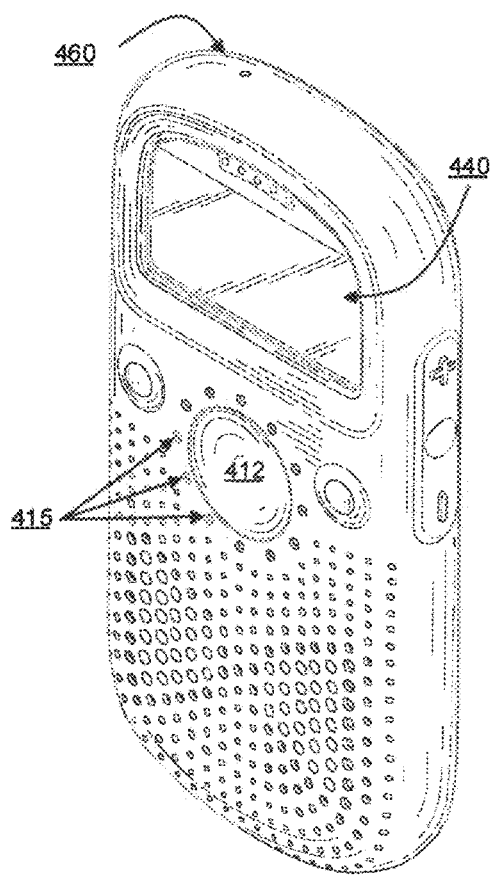
FIG. 4 illustrates a perspective view of an example portable communication device exterior according to an embodiment.
Figure 4B:
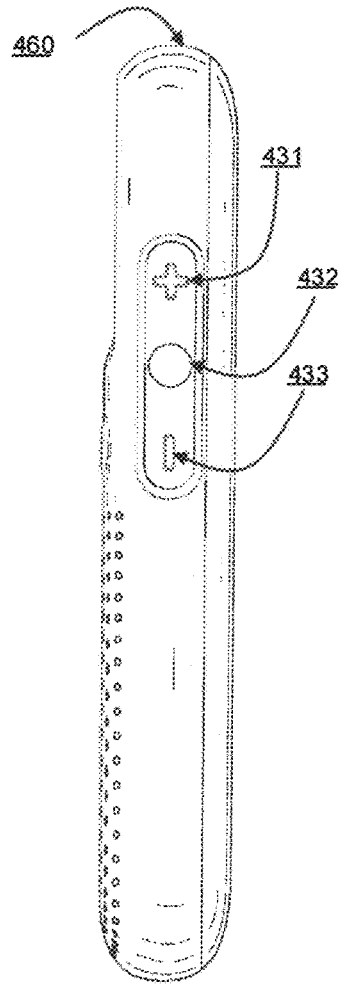
FIG. 4B illustrates a first side view of the example portable communication device of FIG. 4.
Figure 4C:
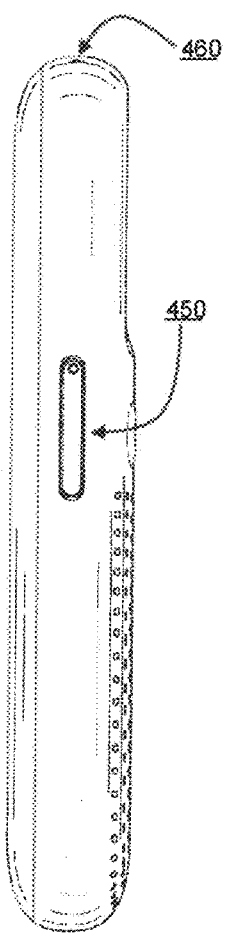
FIG. 4C illustrates a second side view of the example portable communication device of FIG. 4.

Referring to FIGS. 4, 4B, and 4C, in an embodiment a PCD 460 may include a screen 440, and feature a voice interface and control button 412. In an embodiment, PCD 460 may include one or more of several radio interfaces (not shown), including a GPS module, a near field communication (NFC) device, a LoRa transceiver, a cellular transceiver, a Wi-Fi transceiver, and a short-range wireless (e.g., BLUETOOTH) transceiver. Components of PCD 460 components may be controlled by one or more CPUs (not shown), such as in the form of a microprocessor that communicates with the internal components using a bus (not shown).

Control button 412 may be touched or pressed to activate a function, such as a voice interface. Indicator lights 415, which may take the form of light emitting diodes (LEDs), may be used as an output device, for example to indicate the device state, such as powering or powered on, powering or powered off, battery level, connected/disconnected, PTT input receiver activated, message transmitted, message received, direction, etc. The surface of PCD 460 may provide openings for receiving and transmitting audio signals, for example audio input via a microphone included in audio I/O device (not shown) and transmitting audio output via a speaker (not shown). In an embodiment, the PCD 460 may include one or more physical buttons and/or rocker switches. For example, as shown in FIG. 4B, three physical buttons 431, 432, and 433 may be present on the side of the PCD to allow for user input/control, such as volume adjustment functions, acknowledging alerts or indications, etc. In some embodiments, the PCD 460 may also include a port or slot 450, e.g., for insertion of an SD card or SIM card.

Event-based Profile Management

Figure 5:
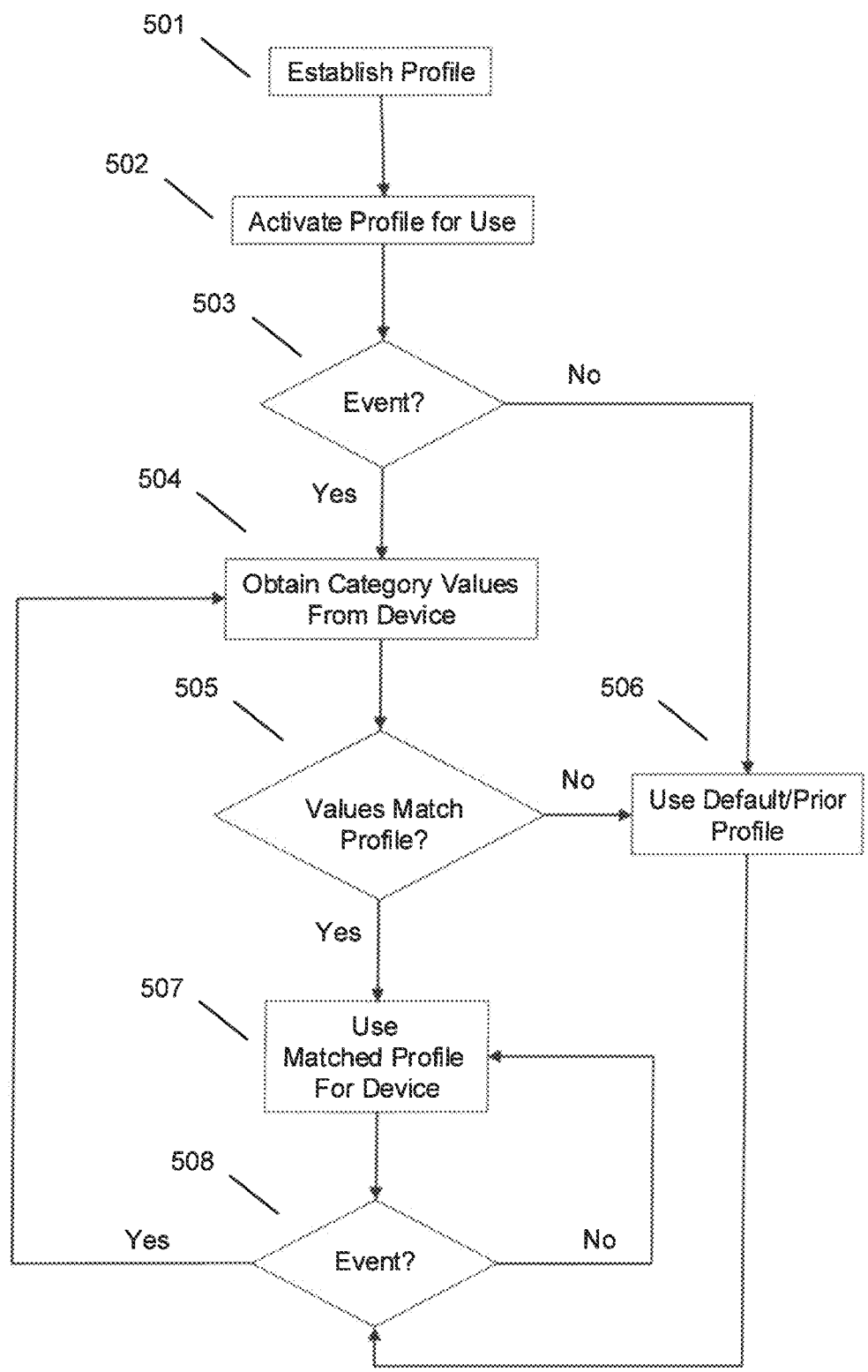
FIG. 5 illustrates an example method according to an embodiment.

As shown in FIG. 5, an embodiment facilitates establishing, distributing, and dynamically updating a profile of a PCD. In an embodiment, a profile is established at 501. A profile typically contains various identifying features or characteristics of a user and/or a function in addition to any logical communication channels, permissions, or restrictions associated with the profile. For example, a profile suitable for use in a specific context, such as by a particular user, in a particular place, at a particular time, or similar is established. One or more established profiles may be grouped into new profiles, for example a set of profiles associated with a role, a physical location, or a user group. In an embodiment, the profile may be established using an interface to a cloud platform server such as CPS 100. For example, a user may include categories for the profile using a graphical user interface (GUI) of an application.

In an embodiment, a profile is activated for use at 502. The activation at 502 may include a set of conditions that trigger the use of the profile based on one or more events. For example, activating a profile may associate it with an event-based rule or workflow that when triggered, for example in response to determining a geographic location event, distributes the profile to one or more PCDs. By way of specific example, a customer may have five (5) separate locations, such as hotel properties, under a single account. There may be five hundred and ten (510) PCDs active and managed by the account. The account may be divided into subsets, for instance 100 PCDs at each of the five locations, plus ten (10) other PCDs for users that may roam between the five locations. Those ten (10) PCDs may require a different configuration (profile type), distinct from any of the configurations (profile types) used in each of the five (5) locations. However, when one of those roaming PCDs is on location at one of the five sites, it may need to be reconfigured to access the channels and groups that pertain to that site. Rather than being manually configured, which may be difficult and error-prone, the PCD may be automatically configured for access via an event-based workflow, for example triggered by a geofence event as the PCD enters the specific location.

As shown in FIG. 5, an event is determined at 503 that is related to profile distribution or configuration. By way of example, a general manager user has oversight over all five sites (e.g., hotels A-E). When the general manager user travels to a particular site with a PCD, say hotel A, the PCD automatically triggers an event associated with a geofence for hotel A, as illustrated at 503. This may be accomplished using any of available location technologies, such as use of GPS coordinates, local beacons, triangulation, motion-based prediction, etc. In response, an embodiment may obtain one or more category values from the PCD, for example a user identification, location, current profile name, or similar, as illustrated at 504.

An embodiment uses the category values obtained from the PCD of the general manager user to determine which stored profiles the category values match, as indicated at 505. In the case where the category values are determined to match a profile at 505, the PCD may then be configured to use the matched profile as indicated at 507. In one embodiment, the PCD is configured via an over the air (OTA) updating process by which the PCD is provisioned with the matched device profile. In another embodiment, the matching is performed and the stored profiles are on the PCD or another local device, resulting in automatic re-configuration without external connection. By way of specific example, a stored profile may define a configuration for a PCD to be used at 507, such as adding the PCD to a set of logical communication channels associated with Hotel A, such as the security channel for Hotel A, the housekeeping channel for Hotel A, the front desk channel for Hotel A, and the maintenance channel for Hotel A.

As indicated in FIG. 5, if no event occurs, a default or last-used profile may be provided to or maintained by a PCD, as indicated at 506. Note that the use of a profile after the event, whether a new profile, a default profile or last-used profile, may be subject to additional security considerations, such as confirming that the current user is authorized to utilize the profile in that location. Authorization may be provided via a voice print or other biometric security check, detecting the co-presence of a trusted personal device via near field or short-range wireless communication, or similar.

Further illustrated in FIG. 5 is that an embodiment may dynamically change or update a profile associated with or used by the PCD over time. Continuing with the foregoing example, while the general managing user is onsite at hotel A, the PCD may be configured to access and use each of the logical communication channels associated with a profile provided at 507. This profile, for example, may be stored by CPS 100 and indicates that this profile is considered a superuser role and has permissions for all the sites associated with the account. Thus, when PCD initially sends a location signal (e.g., GPS coordinates, beacon data, etc.) at 503, CPS 100 performs one or more checks, e.g., to determine that location signal corresponds to a site location, indicated at 505, which user is associated with the PCD, etc. If the one or more checks are affirmed, PCD is automatically sent an OTA profile update at 507. As the PCD roams, for example leaves the current site (e.g., exits a geofenced area such as area 101 illustrated in FIG. 1 that encompasses the site), a dynamic update may occur responsive to the event, as indicated at 508.

Continuing with the prior example, when the general manager user exits the site of hotel A, as determined at 508, the category values are again obtained from the PCD, indicated at 504, and it is determined if the category values match a profile, e.g., profile type: general manager user, hotel A. In such case, no profile may match, i.e., the device category values obtained at 504 will no longer match given the lack of appropriate location value, and thus the configuration may be reverted to a default or previous profile, as indicated at 506. In an embodiment, the action taken at 506 may differ, for example the current profile may be deleted. Similarly, any subsequent event, as determined at 508, may result in an evaluation of device category values against profile types to determine, at 505, whether a matched profile is available.

Figure 6:
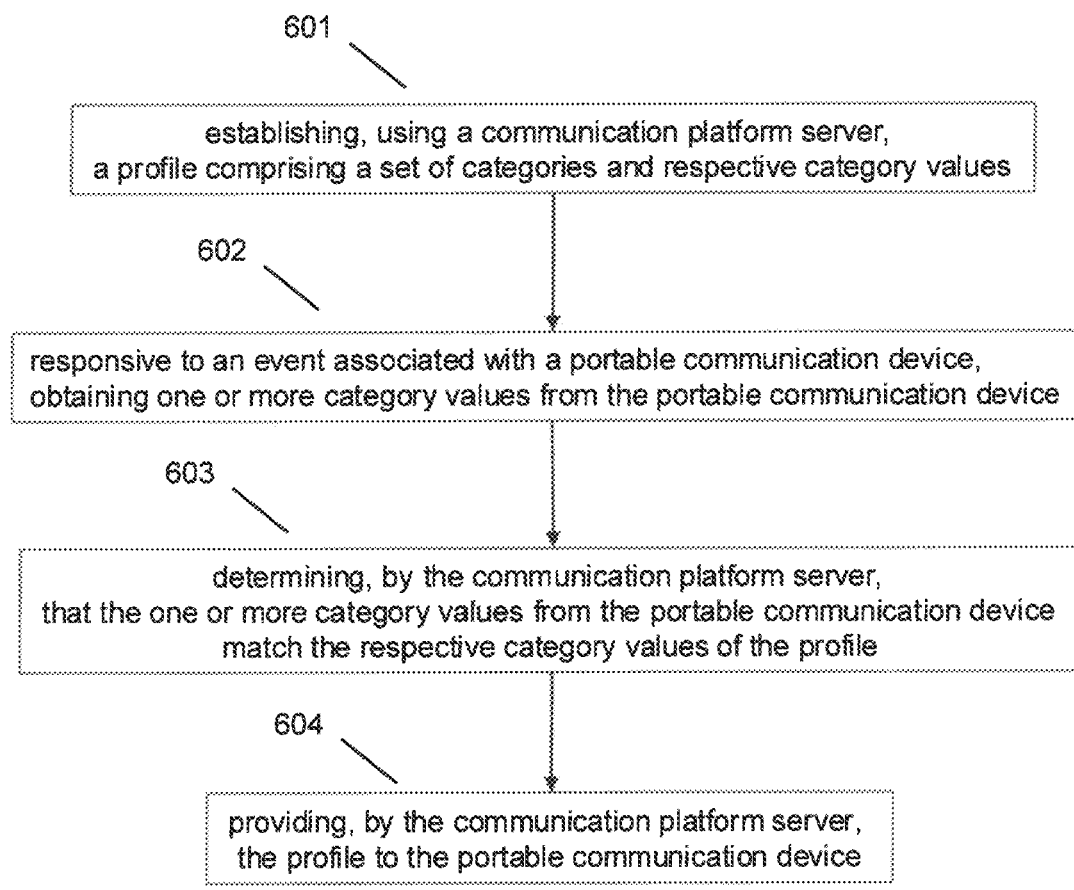
FIG. 6 illustrates an example method according to an embodiment.

As shown in FIG. 6, an embodiment facilitates event-based profile provisioning and updating. In the example of FIG. 6, a method includes establishing, using a CPS, a profile comprising a set of categories and respective category values at 601. For example, the profile may include categories of user role and location, with respective category values of "general manager" and "Hotel A." The method includes, responsive to an event associated with a PCD, obtaining one or more category values from the PCD at 602. For example, the event may be crossing into a geofenced area and collecting a device or user identifier in combination with a current location or site as category values. In an embodiment, the method includes determining, by the CPS, that the one or more category values from the PCD match the respective category values of the profile at 603. For example, the CPS may determine that the user is associated with a role and the location is associated with a site, each of which are specified in a profile, such as general manager for Hotel A. In an embodiment, the method includes providing, by the CPS, the profile to the PCD, as indicated at 604. For example, an embodiment may provide a matching profile to the PCD, such as via OTA update or via another mechanism, such as local transmission from a near-field device, locally unlocking a prestored profile on the PCD, etc.

Token-based Profile Management

Figure 7:
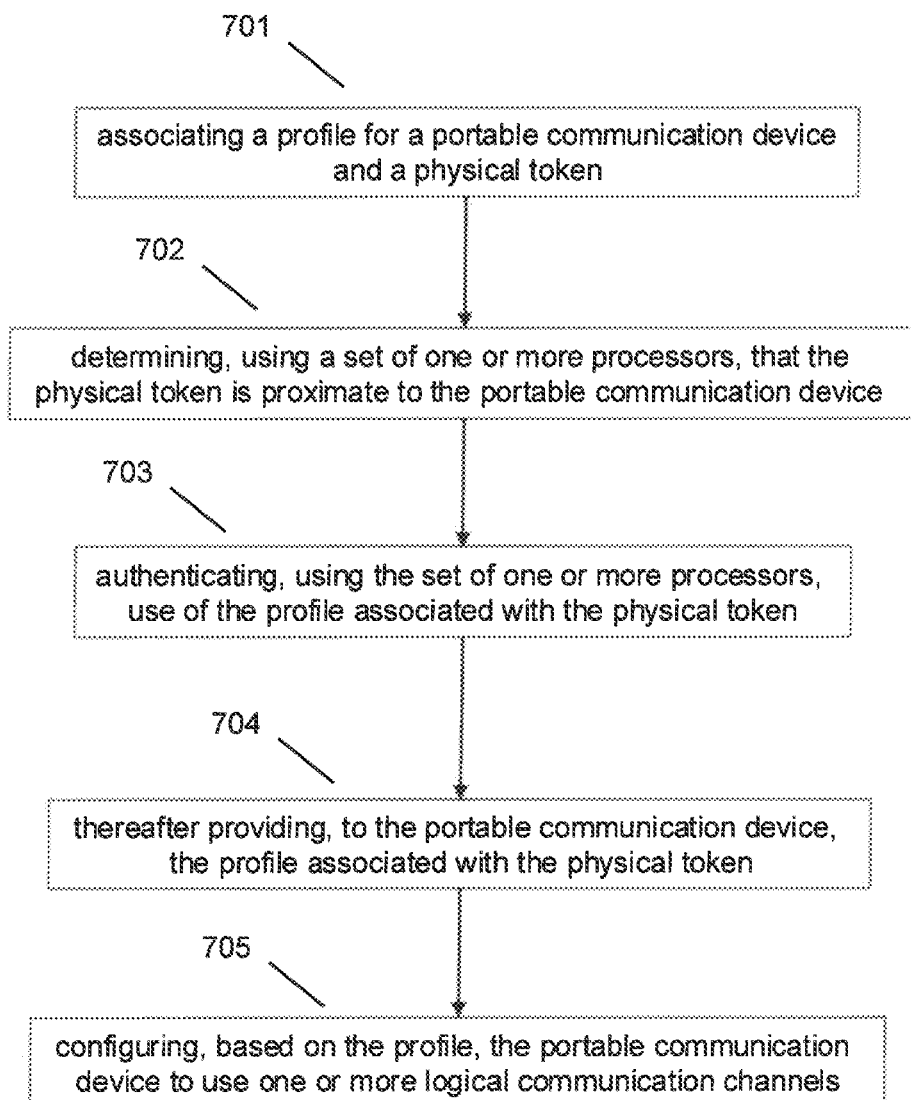
FIG. 7 illustrates an example method according to an embodiment.

Referring to FIG. 7, in an embodiment the configuring of a PCD may be based on proximity to a physical token such as a near-field communication device. In one example, a method may include associating a profile for a PCD and a physical token, indicated at 701. For example, a user may establish a profile using graphical user interface (GUI) of CPS 100, activating it for user(s) via a workflow or rule set, such as associating the profile with an NFC device of a user, a location, and/or a particular timeframe. In an embodiment, the method may include storing the profile on the NFC device.

The method may include determining, using a set of one or more processors, that the physical token is proximate to the PCD, as indicated at 702. For example, a user may bring a badge (or the like) proximate to a PCD. The method may include authenticating, using the set of one or more processors, use of the profile associated with the physical token, as indicated at 703. For example, CPS 100 may authenticate a user profile for use per the workflow or ruleset conditions, confirming that the user profile is active and permitted to be used. The method may include thereafter providing, to the PCD, the profile associated with the physical token, as indicated at 704. As described herein, the provisioning of the profile may be accomplished in a variety of ways, including OTA update, local transmission from NFC badge, etc. The method may include configuring, based on the profile, the PCD to use one or more logical communication channels, as indicated at 705. For example, the profile may specify one or more logical communication channels that are established for the PCD based on the profile.

By way of example, each user may be issued an NFC device such as, for instance, a badge. The user may utilize the badge to sign in and out of a PCD based on proximity. In an embodiment, a user's badge contains the user's profile information. When the badge is scanned by or detected by a PCD, the PCD signals to CPS 100 to perform an authentication, for example of the user profile on the badge. Once authenticated, e.g., confirmed as an active profile associated with the badge, the profile is loaded or otherwise provided to the PCD. Thus, users can select from a pool of PCDs that are not provisioned for them. Based on the badge, the user profile information for the user is selected and provided. This makes PCDs interchangeable from user to user and day to day, shift to shift, etc. Sometimes, a PCD may already be provisioned with a profile. If a new profile is to be loaded on the PCD using the NFC method described, the PCD and/or the CPS may alert the user that a profile is already present on the PCD and require the user to confirm that the new profile should replace the existing profile.

By way of specific example, a senior level security guard user on the day shift has an assigned profile that grants access to a first set of communication channels. A junior level security guard user is on the night shift and has a second, different assigned profile. When the senior level security guard user pairs an available PCD to a badge, a unique OTA profile update is supplied to configure the PCD, i.e., the first profile. The first profile may be disabled or deleted responsive to an event, such as a reaching a predetermined time, such as the end of the day shift, exiting a geofenced area, entering a storage bin location, etc. The PCD is returned to the pool of PCDs available to the security team, ready to be configured for another user. When the junior level security guard user uses the same PCD and pairs it to their badge, the PCD again is provided with an OTA profile update that is different from the profile previously stored on the PCD, i.e., the second profile is provided, which may have a reduced set of logical communication channels.

Profile Tags

In an embodiment, data associated with a currently active profile may be used as the basis of further processing, for example natural language processing and related tasks performed by an artificial intelligence (AI) assistant. In an embodiment each PCD and its respective current user is uniquely identified, along with the current configuration profile of the PCD. The information contained in a profile may include attributes of that user, offering an ability for an embodiment to personalize responses and actions on the PCD. The attribute information in a profile may be unique to the user such as a name and their logical communication channel settings such as channels to which the user is a member, language preferences and message format preferences. Other attribute information may indicate more general identifiers, such as a user role, location information (e.g., shop floor), permissions associated with a user role or user group, restrictions applied at the profile level, department, etc.

Much of the profile attribute information may be characterized as a "tag" or category value. Tags may be organized in a variety of ways to assist in performing tasks, communicating among users, disseminating information to users, etc. In an embodiment, tags may be used to provide personalized processing and responses using an AI assistant, which utilizes tag values to discern intents and/or formulate responsive actions.

An example profile is provided in table 1.

TABLE 1 example profile

| Category | Tag |
| --- | --- |
| Name: | Hugo Garcia |
| Language setting: | Spanish |
| Department: | Nursing |
| Role: | Registered Nurse |
| Geofence restrictions: | None |
| Status: | On-call |
| Shift: | 8:00 a.m.-8:00 p.m. |
| Security level: | 4 |
| Preferred message format: | Audio |
| Location: | 5th Floor ICU [updates periodically] |
| Logical channel membership: | On call nursing |

In the example profile of table 1, the language setting may be considered a category and "Spanish" may be considered a "tag" or category value. Other language setting tags may include English, French, German, Chinese, etc. Role may be another category for which "registered nurse" may also be considered a tag. Other tags for the category 'role' could be doctor, orderly, custodial, administrative, surgeon, physician assistant, intern, etc. The status category indicator of on-call may further include status tags like off-duty or on break. As described herein, the values or tags of the profile may update automatically, for example based on change in location, time of day affecting status or shift change, proximity of local devices, etc. Other PCD users similarly have profiles and categories/tags associated with respective PCDs. There could be many dozens, hundreds, or thousands of users/PCDs in a system. When on-line, each PCD is connected in a network, for example via a CPS that manages the PCDs, to permit a profile or profile tag to be dynamically distributed, updated, and removed.

In an embodiment, a user interface provides an AI assistant. Users can interact with the AI assistant to seek information, disseminate information, perform tasks, etc. The AI assistant discerns intent from a user's input, such as spoken instructions, to a PCD and acts on that intent in an automated or semi-automated fashion, e.g., without additional human interaction.

An AI assistant according to an embodiment may be used in combination with, or incorporate part of or an entire large language model (LLM) that forms generative output. In an embodiment, an AI assistant may act as a user interface and so processes the user input data, e.g., applying natural language processing to identify parts of the input, identifying an intent such as a task or requested service, and formatting the user input for an LLM. For example, when a user request would be aided by generative output, e.g., "tell me which on-call nurses for operating room twelve are available and connect me to one," the AI assistant initially processes the user input to identify the relevant tags and intent. Some steps in the user input processing, for example intent recognition, tagging, etc., may be enhanced by an LLM and thus take place out of sequence, in parallel with, or in lieu of AI assistant processing. In an embodiment, an AI assistant processes the user input and other data to provide it in an acceptable format for at least one LLM, such as a predetermined JSON prompt format.

When an AI assistant has formed data for interfacing with an LLM, an application programming interface (API) call may be used to transfer the data. An example of data sent by an AI assistant to an LLM includes but is not limited to the user input data, e.g., converted from audio to text, contextual information such as conversation history, user preferences, device data, retrieval augmented data, etc., one or more parameters that define the desired output (such as the length of the generative response, its tone, etc.), and the like.

In an embodiment, the LLM may be implemented on the CPS or may be an external service. The LLM receives the request and processes it using its language generation capabilities, which may be tuned for one or more specific topic domains. An LLM typically uses tokenization and attention mechanisms to focus on relevant parts of the input and context to generate an output token (in a token-by-token manner). The LLM returns the output back to the AI assistant via the API. The AI assistant may then present the generative output, for example using text to speech processing of a voice interface, as described herein. For a variety of reasons, such as privacy, some LLM processing may occur locally on a PCD, particularly for simpler tasks that may be serviced by smaller or more manageable LLMs able to run in the local environment. A hybrid solution is also possible, where certain LLMs (or functions thereof) run on-PCD for basic tasks, and others are server or cloud-based.

By way of example, consider the user interaction with the AI assistant in which an administrative user in a location such as on the 5th floor of a hospital is helping a visitor. The visitor speaks Spanish and is the relative of a patient in a room on the 5th floor. The administrative user neither speaks Spanish nor can convey any status information to the visitor.

The administrative user engages the AI assistant in a logical communication channel on a PCD and speaks the following in English: "Summon an on-call nurse on the 5th floor that speaks Spanish to the administrative desk." The AI assistant is tasked with discerning the intent of the statement and performing any tasks required. In this case, the statement includes four (4) tags and a request. The request ("summon") is determined to be paging a co-worker to come to the administrative desk on the 5th floor. The four tags describe the co-worker: 1) a nurse; 2) currently on-call; 3) on the 5th floor; and 4) speaks Spanish. The AI assistant interprets the input tags to search for on-line co-workers whose user profile and location status match the tags. The AI assistant may then determine that a co-worker, a nurse currently on the 5th floor, who is on-call, and speaks Spanish should be messaged. In an embodiment, a user may request different tasks from the AI assistant, such as a request to establish a communication channel, a request to transmit a message to a user, a request to summon or page a user, etc. The profile tags may be used by the AI assistant to ensure any action provided is correct and useful.

Figure 8:
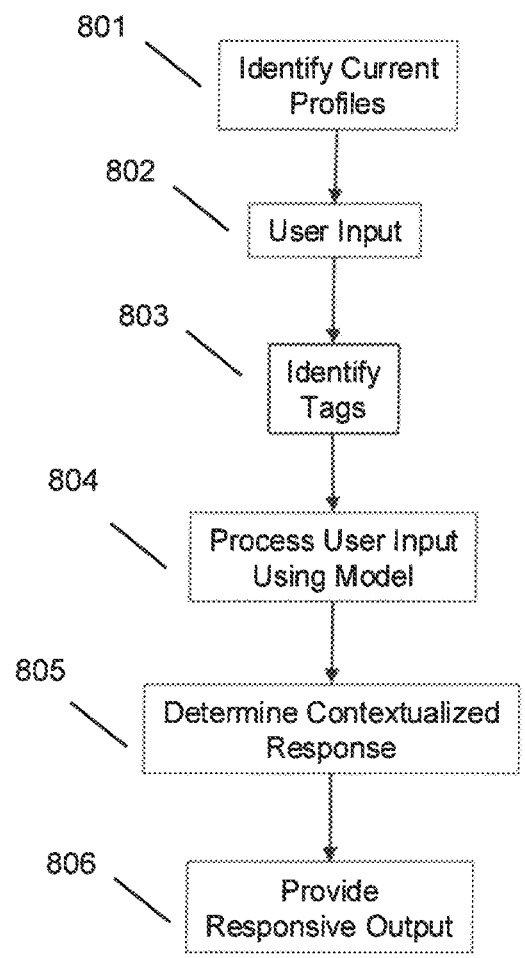
FIG. 8 illustrates an example method according to an embodiment.

As illustrated in FIG. 8, an embodiment may identify current profiles active in the system, as indicated at 801, which are used to access and use a current set of active profiles' tags. Thus, on receipt of user input as indicated at 802, an embodiment parses the user input to identify tokens, such as words, parts-of-speech, or phrases. A token may be related to one or more of the profile tags, which are identified to assist in discerning intent or completing a task, as indicated at 803. By way of example, an embodiment may utilize currently active profile tags within a system, such as from all profiles associated with an account, to aid in processing the user input, for example identifying keywords, tokenizing the input, etc. Similarly, the currently active tags identified may be used to take decisions regarding intent, for example resolving a user input as synonymous with available actions. For example, the action of establishing a new logical communication channel may be improved by using current logical communication channel names, users associated therewith, etc.

An embodiment may therefore process the user input using a model, as indicated at 804, which may be trained or fine-tuned based on identified profile tags. For example, in an embodiment the model may be trained to recognize words and intents that are aligned with the identified profile tags or tag collections. For example, an embodiment may identify synonyms by reference to tag values, which supply context to word identification and intent determination. This permits an embodiment to determine a contextualized response, as indicated at 805. For example, in an embodiment an AI assistant may perform a responsive action as indicated at 806, such as to communicate to a user having profile tags matching those identified from the requesting user input, establish a new logical communication channel with a user, etc.

Figure 9:
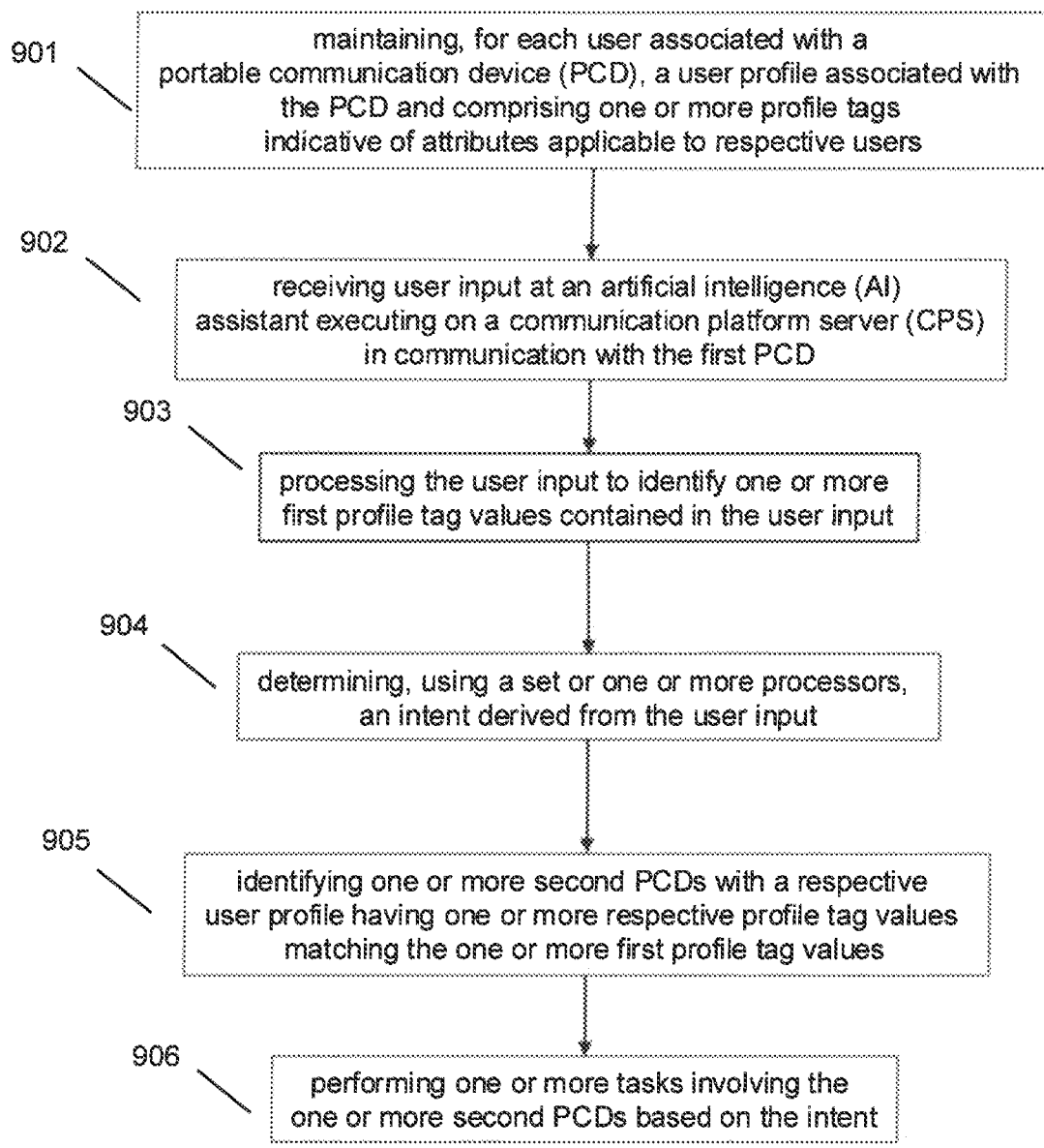
FIG. 9 illustrates an example method according to an embodiment.

Shown in FIG. 9 is a method according to an embodiment for using tag(s) to assist in making responses. As illustrated the method may include maintaining, for each user associated with a PCD, a user profile associated with the PCD (e.g., executing on the PCD) and comprising one or more profile tags indicative of attributes applicable to respective users, as indicated at 901. This permits an embodiment to have a set of active user profiles with tags, for example to conduct contextual user input processing using an AI assistant.

The method may include receiving user input at an AI assistant e.g., executing on a CPS in communication with a first PCD, as indicated at 902. For example, a user of a PCD may provide a voice request to a channel which includes the AI assistant. The method may include processing the user input to identify one or more first profile tag values contained in the user input, as indicated at 903. In one example, the AI assistant uses natural language processing to parse the user input into tokens, which can be related to profile tags to identify profile tag values. For example, a user input of "Summon an on-call nurse on the 5th floor that speaks Spanish to the administrative desk" may be processed to extract, among others, the token "Spanish," which is associated with the profile category "Language setting," indicating "Spanish" is an input profile tag value.

The method may include determining, using a set or one or more processors, an intent derived from the user input, as indicated at 904. For example, an embodiment may relate one or more of the tokens of the user input to a topic or intent defined within the system, for example an action such as establishing a new communication channel, summoning a user that is on-site, paging a user that is on-call, etc. The method may include identifying one or more second PCDs with a respective user profile having one or more respective profile tag values matching the one or more first profile tag values contained in the user input, as indicated at 905. For example, if the user input is processed to identify "Spanish" as an input tag, a search is made for an active user profile tag having a "Spanish" in the language setting category. The method may include performing one or more tasks involving the one or more second PCDs based on the intent, as indicated at 906. For example, a user providing input as a request may be linked to a user having a Spanish language setting currently active, for example in a newly established voice communication channel.

Ad Hoc Temporary Channel Creation

Figure 10:
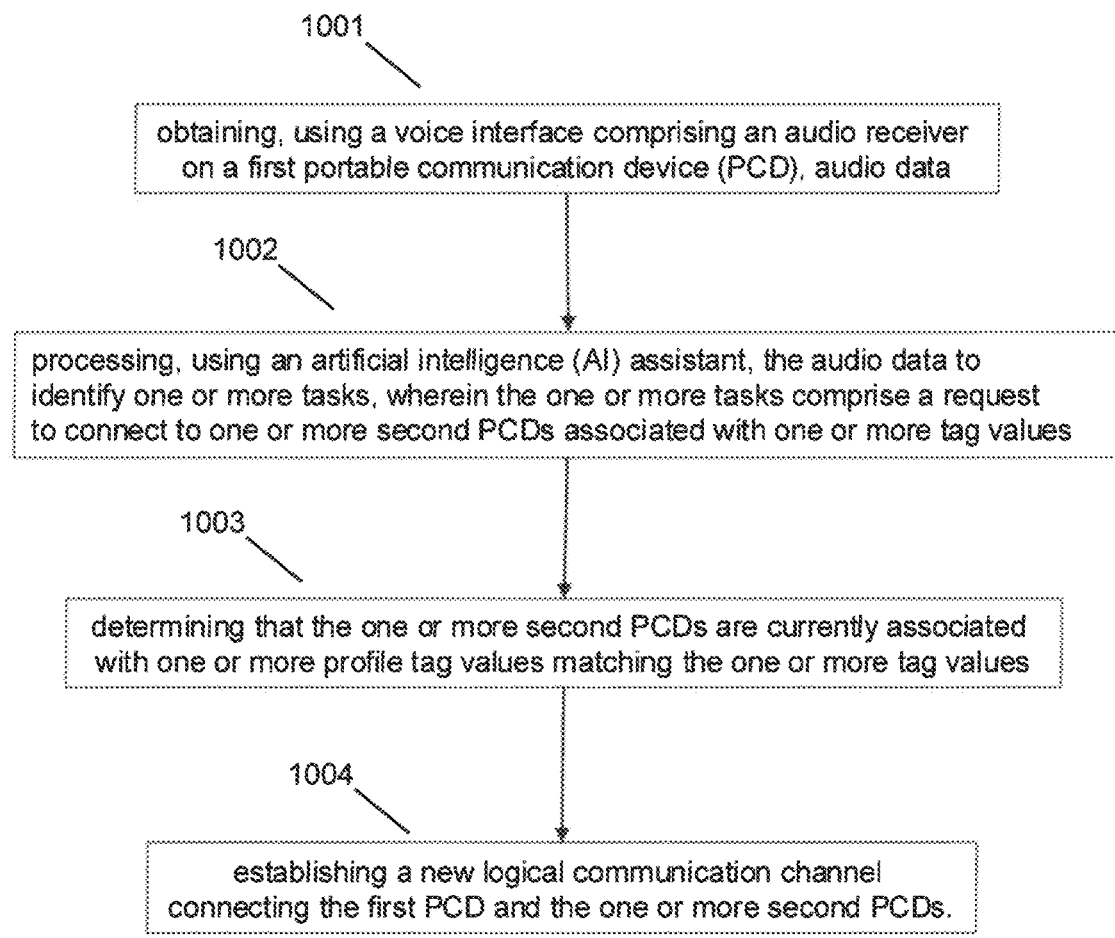
FIG. 10 illustrates an example method according to an embodiment.

As shown in FIG. 10, an embodiment facilitates ad hoc connection requests from a PCD to one or more other entities such as other PDCs, a location, or a role. In the example of FIG. 10, a method includes obtaining, using a voice interface comprising an audio receiver on a first PCD, audio data, indicated at 1001. In an embodiment, a user may activate an AI assistant. For example, a user may press a specific activation button or speak a specific activation phase (e.g., "Hey Assistant"). Once the activation button/phrase is received by the PCD, the user may receive confirmation (e.g., audio tone/voice confirmation or visual indicator confirmation, such as illuminating one or more indicator lights, e.g., indicated at 215, 315, or 415). The method may further include processing, using an AI assistant, the audio data to identify one or more tasks, wherein the one or more tasks comprise a request to connect to one or more second PCDs associated with one or more tag values, indicated at 1002. The method may further include determining that the one or more second PCDs are currently associated with one or more profile tag values matching the one or more tag values, indicated at 1003. The method may also include establishing a new logical communication channel, which may be temporary or ephemeral, followed by an action, such as connecting the first PCD and the one or more second PCDs, indicated at 1004.

By way of example, a user may speak the following in English to the PCD, "Open a communication channel to all on-call nurses on the 5th floor that speak Spanish." The spoken words may then be obtained by the PCD using a voice interface (e.g., an audio receiver, such as a microphone or the like), indicated at 1001. Based on this audio data, the AI assistant is tasked with discerning the intent of the statement, establishing a new channel, and acting on any tasks required. In this case, the statement includes four (4) tags and a request. The request ("open a communication channel") is determined to be a request to create a new ad hoc communication channel that did not exist previously, as indicated at 1002. Once the communication channel is created, the intended parties may be joined, indicated at 1004.

For example, the four tags in the above example describe the co-worker(s): 1) a nurse; 2) on-call; 3) on the 5th floor; and 4) speaks Spanish. The AI assistant interprets the tag values to search for PCDs associated with the one or more profile tag values, indicated at 1003. The AI assistant may then determine that there are four total co-workers who satisfy the tag requirements (i.e., a nurse currently on the 5th floor, who is on-call, and speaks Spanish), and thus should be included in the newly created temporary communication channel for these PCDs and the requesting PCD. Based on these factors, the method may then complete the new logical communication channel by including the first PCD and the four PCDs associated with the four co-workers that satisfy the tag value requirements, indicated at 1004. Thus, in an embodiment, a user may request the AI assistant establish a communication channel to one or more other PCDs/users, and the AI assistant can utilize the profile tags to ensure the action provided is correct and useful.

In some embodiments, the new ad hoc communication channel may be created person to person. For example, USER1 engages the AI assistant (e.g., pressing an activation button or speaking a specific activation phase) on a PCD and says "Call USER2". The AI will then discern that USER1, on PCD1, wishes to speak directly with USER2 on PCD2, and thus create a new temporary communication channel. In an embodiment, if USER1's request is too vague (e.g., there are multiple USER2s), the AI may offer to connect all users that match the request, or request further clarification (e.g., ask the requester to indicate USER2's last name). In this regard, the active tags of PCDs in the system may be used to formulate contextually relevant clarification requests, output to the requesting user via the AI assistant, such as via audio or another output mechanism. However, if no confusion exists regarding the request, the AI assistant, for example in accessing data of CPS, may then determine if USER2 is currently on-line, and if not, return a message to USER1 that USER2 is not available. However, if USER2 is available, the AI assistant may send a message to USER2 that USER1 is calling. If USER2 accepts the invitation (e.g., pressing an acceptance button or speaking a specific acceptance phase) the users will then be added to the logical channel between USER1 and USER2. In some embodiments, the channel may stay active until USER1 or USER2 disconnects, USER2 no longer meets the tag values (e.g., no longer on-call), or until some predefined metric is met (e.g., timeout). Once the channel is deactivated it may be deleted and each PCD may revert to the last channel it was on.

In some embodiments, the new ad hoc communication channel may be created person to role. For example, USER1 engages the AI assistant (e.g., pressing an activation button or speaking a specific activation phase) on a PCD and says, "Call a doctor on call". The AI assistant will then discern that USER1, on PCD1, wishes to speak directly with an on-call doctor on PCD2. If USER1's request is too vague (e.g., there are multiple doctors on call), the AI assistant may offer to connect all users that match the request, or request further clarification (e.g., ask the requester for the name or department of a specific on-call doctor). However, if no confusion exists regarding the request, the AI assistant may then determine if the on-call doctor is currently on-line, and if they are not, return a message to USER1 that they are not available. However, if the on-call doctor is available, the AI assistant may send a message to doctor that USER1 is calling. If the doctor accepts the invitation (e.g., pressing an acceptance button or speaking a specific acceptance phase) the AI assistant will establish a logical channel between USER1 and the on-call doctor. In some embodiments, the channel may stay active until someone disconnects or no longer meets the tag values (e.g., no longer on-call), or until some predefined metric is met (e.g., timeout). Once the channel is deactivated it may be deleted and each PCD may revert to the last channel it was on.

In some embodiments, the new ad hoc communication channel may be created person to location. For example, USER1 engages the AI assistant (e.g., pressing an activation button or speaking a specific activation phase) on a PCD and says, "Call 3rd floor lab." The AI assistant will then discern that USER1, on PCD1, wishes to speak directly with PDC2 that is assigned to the 3rd floor lab. In these embodiments, the PDCs may be associated with a location profile or associated with a location indirectly via a value stored in a user profile. Once the temporary channel is created, the AI assistant may then determine if the 3rd floor lab PCD is currently on-line, and if not, return a message to USER1 that the 3rd floor lab is not available. However, if the 3rd floor lab is available, the CPS may send a message to the 3rd floor lab that USER1 is calling. If the someone in the 3rd floor lab accepts the invitation (e.g., pressing an acceptance button or speaking a specific acceptance phase) the AI assistant will add them to the logical channel. In some embodiments, the channel may stay active until someone disconnects or no longer meets the tag values (e.g., no longer on-call), or until some predefined metric is met (e.g., timeout, all PCDs associated with the lab are no longer located in proximity to the lab, etc.). Once the channel is deactivated it may be deleted and each PCD may revert to the last channel it was on.

Figure 11:
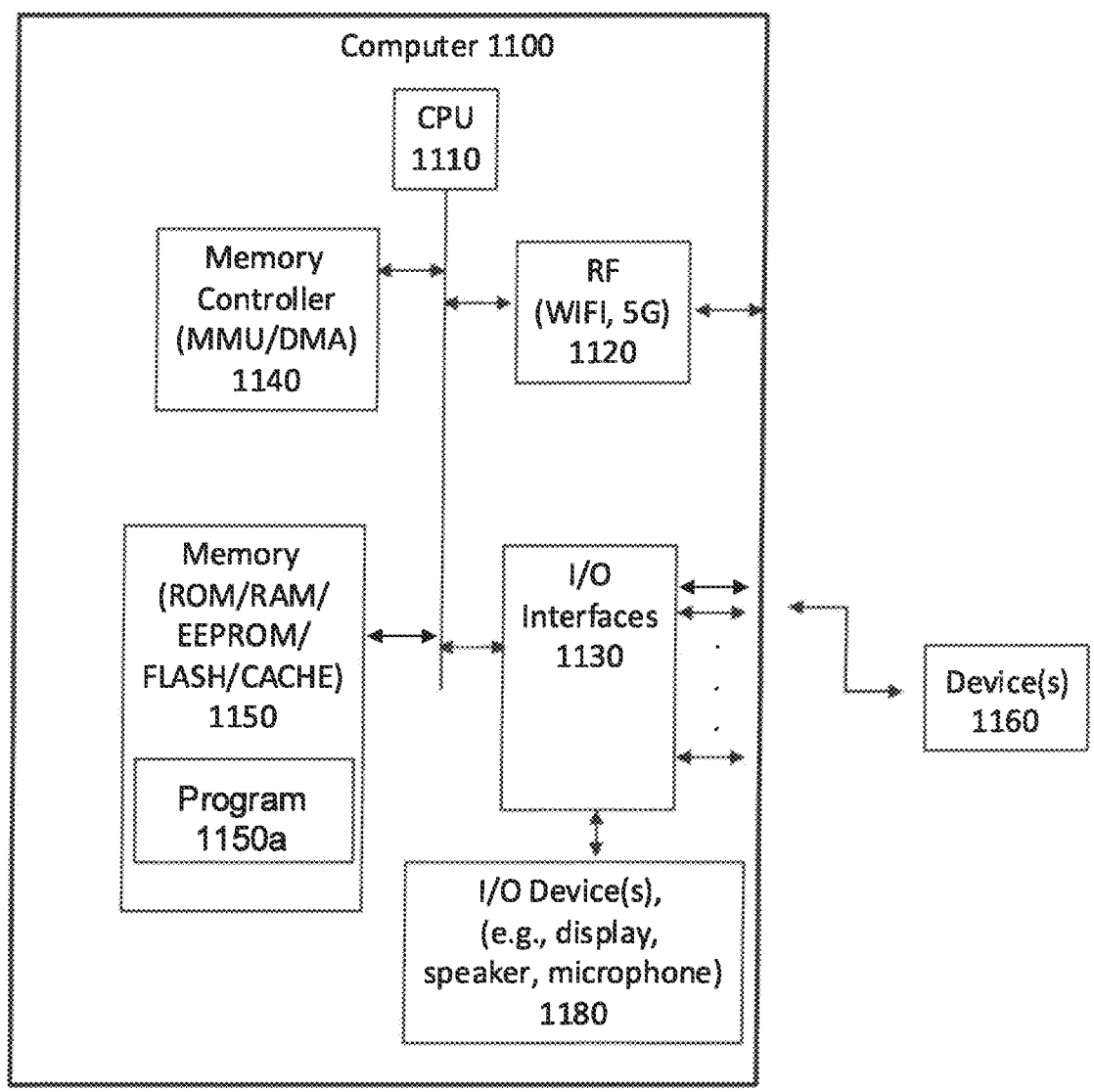
FIG. 11 illustrates an example system and components according to an embodiment.

Referring to FIG. 11, it will be readily understood that certain embodiments can be implemented using any of a wide variety of devices or combinations of devices and components. In FIG. 11 an example of a computer 1100 and its components are illustrated, which may be used in a device such as CPS 100 or PCDs 160a-160f for implementing certain of the functions or acts described herein, e.g., executing a profile-based configuration or other described applications, embodied in program 1150a, in turn implementing acts or subsets thereof of FIG. 5 through FIG. 10. Also, circuitry other than that illustrated in FIG. 11 may be utilized in one or more embodiments. The example of FIG. 11 includes certain functional blocks, as illustrated, which may be integrated onto a single semiconductor chip to meet specific application requirements.

One or more processing units are provided, which may include a central processing unit (CPU) 1110, one or more graphics processing units (GPUs), and/or micro-processing units (MPUs), which include an arithmetic logic unit (ALU) that performs arithmetic and logic operations, instruction decoder that decodes instructions and provides information to a timing and control unit, as well as registers for temporary data storage. CPU 1110 may comprise a single integrated circuit comprising several units, the design and arrangement of which vary according to the architecture chosen.

Computer 1100 also includes a memory controller 1140, e.g., comprising a direct memory access (DMA) controller to transfer data between memory 1150 and hardware peripherals. Memory controller 1140 includes a memory management unit (MMU) that functions to handle cache control, memory protection, and virtual memory. Computer 1100 may include controllers for communication using various communication protocols (e.g., I2C, USB, etc.).

Memory 1150 may include a variety of memory types, volatile and nonvolatile, e.g., read only memory (ROM), random access memory (RAM), electrically erasable programmable read only memory (EEPROM), Flash memory, and cache memory. Memory 1150 may include embedded programs, code, and software, e.g., program 1150a, that provides coded methods such as illustrated and described in connection with FIGS. 5-10. By way of example, and not limitation, memory 1150 may also include an operating system, application programs, other program modules, code, and program data, which may be downloaded, updated, or modified via remote devices.

A system bus permits communication between various components of the computer 1100. I/O interfaces 1130 and radio frequency (RF) devices 1120, e.g., Wi-Fi and telecommunication radios, near field communication modules, etc., may be included to permit computer 1100 to send data to and receive data from remote devices using wireless mechanisms, noting that data exchange interfaces for wired data exchange may be utilized. Computer 1100 may operate in a networked or distributed environment using logical connections to one or more other remote computers or devices 1160, for example in a system comprising a CPS and a set of PCDs. The logical connections may include a network, such local area network (LAN) or a wide area network (WAN) but may also include other networks/buses. For example, computer 1100 may communicate data with and between device(s) 1160.

Computer 1100 may therefore execute program instructions or code configured to provide CPS and/or PCD functionality and perform other functionality of the embodiments. A user can interface with (for example, enter commands and information) the computer 1100 through input devices, which may be connected to I/O interfaces 1130. A display or other type of I/O device 1180 may be connected to or integrated with the computer 1100, for example via an interface selected from I/O interfaces 1130.

It should be noted that the various functions described herein may be implemented using instructions or code stored on a memory, e.g., memory 1150, that are transmitted to and executed by a processor, e.g., CPU 1110. Computer 1100 includes one or more storage devices that persistently store programs and other data. A storage device or computer readable medium, as used herein, is a non-transitory computer readable medium. Some examples of a non-transitory computer readable medium include, but are not limited to, storage integral to computer 1100, such as memory 1150, a hard disk or a solid-state drive, and removable storage, such as an optical disc or a memory stick.

Program code stored in a memory or storage device may be transmitted using any appropriate transmission medium, including but not limited to wireless, wireline, optical fiber cable, RF, or any suitable combination of the foregoing.

Program code for carrying out operations according to various embodiments may be written in any combination of one or more programming languages. The program code may execute entirely on a single device, partly on a single device, as a stand-alone software package, partly on single device and partly on another device, or entirely on the other device. In an embodiment, program code may be stored in a non-transitory medium and executed by a processor to implement functions or acts specified herein. In some cases, the devices referenced herein may be connected through any type of connection or network, including a local area network (LAN) or a wide area network (WAN), or the connection may be made through other devices (for example, through the Internet using an Internet Service Provider), through wireless connections using a mobile network, or through a hard wire connection, such as over a USB connection.

Example Embodiments are Described by the Following Clauses

A method, comprising: associating a profile for a portable communication device and a physical token; determining, using a set of one or more processors, that the physical token is proximate to the portable communication device; authenticating, using the set of one or more processors, use of the profile associated with the physical token; thereafter providing, to the portable communication device, the profile associated with the physical token; and configuring, based on the profile, the portable communication device to use one or more logical communication channels.

The method described above, wherein the profile comprises a predetermined set of logical communication channels.

The method described above, wherein the determining comprises identifying that one or more of the portable communication device and the physical token is within a geographic area.

The method described above, wherein the providing, to the portable communication device, the profile comprises selecting, based on the geographic area, the one or more logical communication channels.

The method described above, comprising: determining an event associated with the portable communication device; and disabling the profile at the portable communication device.

The method described above, comprising providing a second profile to the portable communication device after the event.

The method described above, wherein the event comprises one or more of identifying a predetermined timeframe has been reached and determining a different physical token is proximate to the portable communication device.

The method described above, wherein the physical token is a near-field communication device.

The method described above, wherein the profile is stored by the near-field communication device.

The method described above, wherein the providing, to the portable communication device, the profile comprises transmitting, from the near-field communication device to the portable communication device, the profile.

A system, comprising: a set of one or more processors; and a non-transitory medium comprising code executable by the set of one or more processors, the code being configurable for: associating a profile for a portable communication device and a physical token; determining that the physical token is proximate to the portable communication device; authenticating use of the profile associated with the physical token; thereafter providing, to the portable communication device, the profile associated with the physical token; and configuring, based on the profile, the portable communication device to use one or more logical communication channels.

The system described above, wherein the profile comprises a predetermined set of logical communication channels.

The system described above, wherein the determining comprises identifying that one or more of the portable communication device and the physical token is within a geographic area.

The system described above, wherein the providing, to the portable communication device, the profile comprises selecting, based on the geographic area, the one or more logical communication channels.

The system described above, comprising code configurable for: determining an event associated with the portable communication device; and disabling the profile at the portable communication device.

The system described above, comprising code configurable for providing a second profile to the portable communication device after the event.

The system described above, wherein the event comprises one or more of identifying a predetermined timeframe has been reached and determining a different physical token is proximate to the portable communication device.

The system described above, wherein the physical token is a near-field communication device.

The system described above, wherein the profile is stored by the near-field communication device.

A computer program product, comprising: a non-transitory medium comprising code executable by a set of one or more processors, the code being configurable for: associating a profile for a portable communication device and a physical token; determining that the physical token is proximate to the portable communication device; authenticating use of the profile associated with the physical token; thereafter providing, to the portable communication device, the profile associated with the physical token; and configuring, based on the profile, the portable communication device to use one or more logical communication channels.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" or "the" preceding an element does not exclude the presence of a plurality of such elements. The mere fact that certain elements are recited in mutually different dependent claims does not indicate that these elements cannot be used in combination. The word "about" or similar relative term as applied to numbers includes ordinary (conventional) rounding of the number with a fixed base such as 5 or 10.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized or omitted as appropriate, as the explicit illustrated examples are used only for descriptive purposes and are not to be construed as limiting.

As used herein, the statement that two or more parts or components are "coupled" shall mean that the parts are joined or operate together either directly or indirectly, e.g., through one or more intermediate parts or components, so long as a link occurs. As used herein, "operatively coupled" means that two or more elements are coupled to operate together or are in communication, unidirectional or bidirectional, with one another. As used herein, the term "number" shall mean one or an integer greater than one (i.e., a plurality). As used herein a "set" shall mean one or more.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method, comprising:
    associating a profile for a portable communication device and a physical token;
    determining, using a set of one or more processors, that the physical token is proximate to the portable communication device;
    authenticating, using the set of one or more processors, use of the profile associated with the physical token;
    thereafter providing, to the portable communication device, the profile associated with the physical token; and
    configuring, based on the profile associated with the physical token, the portable communication device to use one or more logical communication channels to communicate with one or more other portable communication devices.

2. The method of claim 1, wherein the profile comprises a predetermined set of logical communication channels.

3. The method of claim 1, wherein the determining comprises identifying that one or more of the portable communication devices and the physical token is within a geographic area.

4. The method of claim 3, wherein the providing, to the portable communication device, the profile comprises:
  selecting, based on the geographic area, the one or more logical communication channels.

5. He method of claim 1, comprising:
  determining an event associated with the portable communication device; and disabling the profile at the portable communication device.

6. The method of claim 5, comprising:
  providing a second profile to the portable communication device after the event.

7. The method of claim 5, wherein the event comprises one or more of identifying a predetermined timeframe has been reached and determining a different physical token is proximate to the portable communication device.

8. The method of claim 1, wherein the physical token is a near-field communication device.

9. The method of claim 8, wherein the profile is stored by the near-field communication device.

10. The method of claim 8, wherein the providing, to the portable communication device, the profile comprises:
  transmitting, from the near-field communication device to the portable communication device, the profile.

11. A system, comprising:
  a set of one or more processors; and
  a non-transitory medium comprising code executable by the set of one or more processors, the code being configurable for:
    associating a profile for a portable communication device and a physical token;
    determining that the physical token is proximate to the portable communication device;
    authenticating use of the profile associated with the physical token;
    thereafter providing, to the portable communication device, the profile associated with the physical token; and
    configuring, based on the profile associated with the physical token, the portable communication device to use one or more logical communication channels to communicate with one or more other portable communication devices.

12. The system of claim 1, wherein the profile comprises a predetermined set of logical communication channels.

13. The system of claim 1, wherein the determining comprises identifying that one or more of the portable communication devices and the physical token is within a geographic area.

14. The system of claim 13, wherein the providing, to the portable communication device, the profile comprises:
  selecting, based on the geographic area, the one or more logical communication channels.

15. The system of claim 11, comprising the code configurable for:
  determining an event associated with the portable communication device; and disabling the profile at the portable communication device.

16. The system of claim 15, comprising the code configurable for providing a second profile to the portable communication device after the event.

17. The system of claim 15, wherein the event comprises one or more of identifying a predetermined timeframe has been reached and determining a different physical token is proximate to the portable communication device.

18. The system of claim 11, wherein the physical token is a near-field communication device.

19. The system of claim 18, wherein the profile is stored by the near-field communication device.

20. A computer program product, comprising:
  a non-transitory medium comprising code executable by a set of one or more processors, the code being configurable for:
    associating a profile for a portable communication device and a physical token;
    determining that the physical token is proximate to the portable communication device;
    authenticating use of the profile associated with the physical token;
    thereafter providing, to the portable communication device, the profile associated with the physical token; and
    configuring, based on the profile associated with the physical token, the portable communication device to use one or more logical communication channels to communicate with one or more other portable communication devices.

* * * * *